US010358536B2

(12) United States Patent
Park et al.

(10) Patent No.: US 10,358,536 B2
(45) Date of Patent: Jul. 23, 2019

(54) FOAMABLE POLYAMIDE COMPOSITION AND FOAM OBTAINED THEREFROM

(71) Applicant: RHODIA OPERATIONS, Aubervilliers (FR)

(72) Inventors: Jung Hoon Park, Incheon (KR); Yeong-Chool Yu, Seoul (KR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 15/033,380

(22) PCT Filed: Oct. 16, 2014

(86) PCT No.: PCT/EP2014/072194
§ 371 (c)(1),
(2) Date: Apr. 29, 2016

(87) PCT Pub. No.: WO2015/062868
PCT Pub. Date: May 7, 2015

(65) Prior Publication Data
US 2016/0257798 A1 Sep. 8, 2016

(30) Foreign Application Priority Data
Oct. 29, 2013 (EP) ...................................... 13190717

(51) Int. Cl.
| | |
|---|---|
| *C08J 9/08* | (2006.01) |
| *C08G 18/60* | (2006.01) |
| *C08G 18/78* | (2006.01) |
| *C08L 53/02* | (2006.01) |
| *C08L 77/00* | (2006.01) |
| *C08G 101/00* | (2006.01) |
| *C08L 23/16* | (2006.01) |
| *C08L 77/02* | (2006.01) |
| *C08L 77/06* | (2006.01) |
| *C08J 9/00* | (2006.01) |
| *C08K 5/29* | (2006.01) |
| *C08K 5/3492* | (2006.01) |
| *C08K 7/14* | (2006.01) |
| *C08K 3/013* | (2018.01) |

(52) U.S. Cl.
CPC .............. *C08J 9/08* (2013.01); *C08G 18/603* (2013.01); *C08G 18/7831* (2013.01); *C08J 9/0061* (2013.01); *C08J 9/0085* (2013.01); *C08K 3/013* (2018.01); *C08K 5/29* (2013.01); *C08K 5/34924* (2013.01); *C08K 7/14* (2013.01); *C08L 23/16* (2013.01); *C08L 53/02* (2013.01); *C08L 77/00* (2013.01); *C08L 77/02* (2013.01); *C08L 77/06* (2013.01); *C08G 2101/00* (2013.01); *C08J 2201/024* (2013.01); *C08J 2203/02* (2013.01); *C08J 2377/00* (2013.01); *C08J 2377/06* (2013.01); *C08J 2423/16* (2013.01); *C08J 2425/08* (2013.01)

(58) Field of Classification Search
CPC ........... C08L 77/00–12; C08L 9/06–08; C08L 25/08–10; C08G 18/60–606
See application file for complete search history.

(56) References Cited

U.S. PATENT DOCUMENTS

| | | | | |
|---|---|---|---|---|
| 4,242,470 A | * | 12/1980 | Gergen | .................... C08L 77/00 525/314 |
| 5,670,102 A | * | 9/1997 | Perman | ............... B29C 44/3453 264/50 |
| 2003/0162900 A1 | * | 8/2003 | Joachimi | .................. C08L 77/00 525/178 |
| 2006/0167124 A1 | * | 7/2006 | Bernard | ............... C08G 18/281 521/163 |

FOREIGN PATENT DOCUMENTS

JP             04266966 A  *  9/1992

OTHER PUBLICATIONS

Machine Translation of JPH04-266966A. Sep. 22, 1992.*
Partial Written Translation of JPH04-266966A. Sep. 22, 1992.*
Tufprene/Asaprene T. Styrene-Butadiene Thermoplastic Elastomers. Asahi Kasei Corporation. Apr. 1, 2016.*

* cited by examiner

*Primary Examiner* — Stephen E Rieth
(74) *Attorney, Agent, or Firm* — Osha Liang LLP

(57) ABSTRACT

Provided is a foamable polyamide composition comprising a) at least one polyamide comprising at least one carboxylic group; b) at least one thermoplastic rubber; and c) at least one compound having at least one isocyanate group; and optionally d) at least one filler and e) at least one additive.

12 Claims, No Drawings

FOAMABLE POLYAMIDE COMPOSITION AND FOAM OBTAINED THEREFROM

CROSS-REFERENCE TO RELATED APPLICATION

The present application claims priority to International Application Number PCT/EP2014/072194, filed Oct. 16, 2014, and to European application No. 13190717.2, filed on Oct. 29, 2013, the whole content of these applications being incorporated herein by reference. Should the disclosure of any patents, patent applications, and publications which are incorporated herein by reference conflict with the description of the present application to the extent that it may render a term unclear, the present description shall take precedence.

FIELD OF THE INVENTION

The present invention relates to foamable polyamide compositions, to processes for producing the same, and to a foam comprising the same. The foam comprising the polyamide composition according to the present invention can be advantageously used as a light-weight material in a motor vehicle application.

BACKGROUND OF THE INVENTION

A polyamide is one of the polymers which are frequently used as engineering plastics for a very wide range of applications.

A foamable polyamide composition is of significant commercial interest and may be used as a light-weight material in aeronautical or motor vehicle, packaging or sound insulation applications, etc.

The foamable polyamide composition may be prepared by chemical methods. For instance, U.S. patent application publication No. 2006/0167124 discloses an expandable polyamide composition comprising at least one isocyanate function, a polyamide and a compound comprising at least one carboxylic acid function, and polyamide foams obtained therefrom.

For particular applications, such as a motor vehicle application, required is a foamable polyamide composition which is capable of providing polyamide foams having a higher foaming ratio than the conventional polyamide foams while still exhibiting excellent mechanical properties. Often, an addition of higher amount of isocyanate compound to polyamide matrix can result in a higher foaming ratio in the polyamide foam, yet such use of higher amount of isocyanate compound may degrade the mechanical properties of the polyamide foam, such as flexural strength, flexural modulus and impact strength, which are necessarily required in certain applications.

Therefore, the foamable polyamide composition which can attain a high degree of foaming with a less addition of isocyanate compound is required in this technology field.

DESCRIPTION OF THE INVENTION

The object of the present invention is therefore to provide a foamable composition, which enables obtaining a foam having a high foaming ratio while maintaining other advantageous mechanical parameters, such as flexural strength, flexural modulus and impact strength, even with a limited use of isocyanate compound.

The present invention relates to a composition comprising:
a) 21.0 to 99.6 wt % of at least one polyamide comprising at least one carboxylic group;
b) 0.3 to 9.0 wt % of at least one thermoplastic rubber;
c) 0.1 to 3.0 wt % of at least one compound having at least one isocyanate group;
d) 0 to 65.0 wt % of at least one filler; and
e) 0 to 2.0 wt % of at least one additive,
wherein the sum of wt % of a) to e) adds to 100 wt %.

Indeed, it has been surprisingly found by the present inventors that a superior foaming ratio can be obtained by the composition according to the present invention, even with a limited amount of a compound having at least one isocyanate group, which is to be added to a polyamide matrix.

One of the essential features of the present invention resides in an addition of a thermoplastic rubber along with a compound having at least one isocyanate group to polyamide matrix. It has also been unexpectedly found that both excellent foaming ratio as well as satisfactory mechanical properties can be attained through combined use of the two components in the foamable polyamide composition.

In the present invention, the term "polyamide" is intended to denote in particular a polyamide comprising recurring units complying with any of formula (I) or formula (II) [recurring units ($R_{PA}$)]:

—NH—R$^1$—CO—                    formula (I)

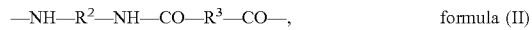

—NH—R$^2$—NH—CO—R$^3$—CO—,            formula (II)

wherein:
   R$^1$, equal to or different from each other at each occurrence, is a divalent hydrocarbon group having from 1 to 17 carbon atoms;
   R$^2$, equal to or different from each other at each occurrence, is a divalent hydrocarbon group having from 1 to 18 carbon atoms; and
   R$^3$, equal to or different from each other at each occurrence, is a divalent hydrocarbon group having from 1 to 16 carbon atoms.

The polyamide of the inventive composition is preferably an aliphatic polyamide, that is to say that R$^1$, R$^2$ and R$^3$ are aliphatic groups.

Recurring units ($R_{PA}$) of the polyamide can be notably obtained through polycondensation reaction of (1) one of β-lactam, 5-amino-pentanoic acid, ε-caprolactam, 9-aminononanoic acid, 10-aminodecanoic acid, 11-aminoundecanoic acid, 12-aminododecanoic acid and/or (2) polycondensation reaction of at least one of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with at least one of diamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9- diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1.8-diamino-1,3-dimethyloctane, 1,8-diamino-1,4-dimethyloctane, 1.8-diamino-2,4-dimethyloctane, 1,8-diamino-3,4-dimethyloctane, 1.8-diamino-4,5-dimethyloctane, 1.8-diamino-2,2-dimethyloctane, 1.8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PA}$) of the polyamide are notably:
(i) —NH—(CH$_2$)$_5$—CO—, i.e. recurring units which can be notably obtained via polycondensation reaction of ε-caprolactam;
(ii) —NH—(CH$_2$)$_8$—CO—, i.e. recurring units which can be notably obtained via polycondensation reaction of 9-aminononanoic acid;
(iii) —NH—(CH$_2$)$_9$—CO—, i.e. recurring units which can be notably obtained via polycondensation reaction of 10-aminodecanoic acid;
(iv) —NH—(CH$_2$)$_{10}$—CO—, i.e. recurring units which can be notably obtained via polycondensation reaction of 11-aminoundecanoic acid;
(v) —NH—(CH$_2$)$_{11}$—CO—, i.e. recurring units which can be notably obtained via polycondensation reaction of laurolactam;
(vi) —NH—(CH$_2$)$_6$—NH—CO—(CH$_2$)$_4$—CO—, i.e. recurring units which can be notably obtained via polycondensation reaction of hexamethylene diamine and adipic acid;
(vii) —NH—(CH$_2$)$_6$—NH—CO—(CH$_2$)$_8$—CO—, i.e. recurring units which can be notably obtained via polycondensation reaction of hexamethylene diamine and sebacic acid;
(viii) —NH—(CH$_2$)$_6$—NH—CO—(CH$_2$)$_{10}$—CO—, i.e. recurring units which can be notably obtained via polycondensation reaction of hexamethylene diamine and dodecanoic acid;
(ix) —NH—(CH$_2$)$_{10}$—NH—CO—(CH$_2$)$_{10}$—CO—, i.e. recurring units which can be notably obtained via polycondensation reaction of decamethylene diamine and dodecanoic acid;
(x) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);
(xi) —NH—(CH$_2$)$_{12}$—NH—CO—(CH$_2$)$_{10}$—CO—, i.e. recurring units which can be notably obtained via polycondensation reaction of dodecamethylene diamine and dodecanoic acid;
(xii) —NH—(CH$_2$)$_{10}$—NH—CO—(CH$_2$)$_8$—CO—, i.e. recurring units which can be notably obtained via polycondensation reaction of decamethylene diamine and decanoic acid;
(k) —NH—(CH$_2$)$_4$—NH—CO—(CH$_2$)$_4$—CO—, i.e. recurring units which can be notably obtained via polycondensation reaction of 1,4-butanediamine and adipic acid; and
(kk) —NH—(CH$_2$)$_4$—NH—CO—(CH$_2$)$_8$—CO—, i.e. recurring units which can be notably obtained via polycondensation reaction of 1,4-butanediamine and sebacic acid.

Preferably, the polyamide consists essentially of recurring units ($R_{PA}$), as above detailed, being understood that end-chain, defects and other irregularities can be present in the polyamide chain, without affecting the properties thereof.

Recurring units ($R_{PA}$) of the polyamide can be all of the same type, or can be of more than one type, that is to say that the polyamide (PA) can be a homo-polyamide or a co-polyamide.

Specific examples of the polyamides which can be advantageously used in the hereby provided composition are notably:
polyamide 6; polyamide 6,6 and mixtures and co-polyamides thereof.

Particularly preferred polyamide to be used in the composition of the present invention is polyamide 6,6.

In the present invention, an amount of at least one polyamide is from 21.0 wt % to 99.6 wt % with respect to the total weight of the composition. Preferably, the amount of at least one polyamide is from 30.0 wt % to 99.1 wt %, more preferably 40.0 wt % to 98.7 wt % with respect to the total weight of the composition.

The polyamide a) of the present invention comprises carboxylic acid groups; these groups may be present at the terminal end of the polyamide and/or distributed along the polyamide chain. These carboxylic acid groups are capable of reacting with the isocyanate groups of the compound c) according the following reaction:

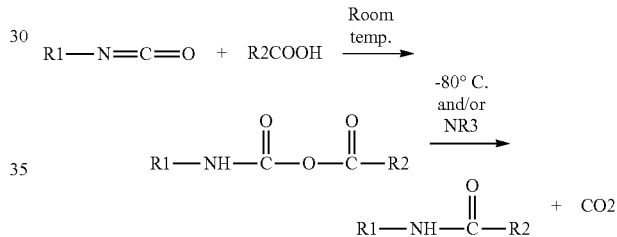

In general, the foamable composition of the present invention comprises a respective amount of carboxylic acid groups and of isocyanate groups that is adapted to the desired release of gas, especially $CO_2$, and thus to the density of the foam obtained from the foamable composition.

In the present invention, the term "thermoplastic rubber" is intended to denote, in particular, a compound imparting flexibility to a polyamide a) of the present invention.

Examples of the thermoplastic rubber in the present invention comprise, but are not limited to, polyolefins, polystyrenes, polyesters, acrylonitrile-butadiene-styrene (ABS) copolymers, polyvinyl chloride (PVC), unplasticized polyvinyl chloride (UPVC), acrylic polymers, and the like.

In one embodiment of the present invention, the thermoplastic rubber comprises ethylene propylene diene rubber (EPDM), ethylene propylene rubber (EPM), and the like.

The term "styrenic thermoplastic elastomer (STPE)" of the present invention is intended to denote, in particular, a styrene-based thermoplastic elastomer and mention may be made of styrene-ethylene/butylene-styrene (SEBS), styrene-ethylene/propylene-styrene (SEPS), styrene-ethylene/ethylene/propylene-styrene (SEEPS), and any combinations thereof.

In the present invention, an amount of at least one thermoplastic rubber is from 0.3 wt % to 9.0 wt % with respect to the total weight of the composition. Preferably, the amount of at least one thermoplastic rubber is from 0.7 wt % to 6.0 wt %, more preferably 1.0 wt % to 4.5 wt % with respect to the total weight of the composition.

In the present invention, the compound having at least one isocyanate group preferably is a polyisocyanate, that is to say a compound comprising at least two isocyanate groups.

The polyisocyanate of the invention is preferably a polyisocyanate of formula (I) below:

in which Y is a substituted or unsubstituted aromatic, aliphatic, cycloaliphatic or heterocyclic multivalent group optionally comprising hetero atoms and n is at least equal to 2. Examples of polyisocyanates that may be suitable are isophorone diisocyanate, 1,3- and 1,4-cyclohexane diisocyanate, 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, α, α'-diisocyanatodipropyl ether, 1,3-cyclobutane diisocyanate, 2,2- and 2,6-diisocyanato-1-methylcyclohexane, 2,5- and 3,5-bis(isocyanatomethyl)-8-methyl-1,4-methanodecahydronaphthalene, 1,5-, 2,5-, 1,6- and 2,6-bis(isocyanatomethyl)-4,7-methanohexahydroindane, 1,5-, 2,5- and 2,6-bis(isocyanato)-4,7-methanohexahydroindane, 2,4'- and 4,4'-dicyclohexyl diisocyanate, 2,4- and 2,6-hexahydrotolylene diisocyanate, perhydro-2,4'- and 4,4'-diphenylmethane diisocyanate, α, α'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, 1,5-naphthylene diisocyanate, 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenyl ether, 4,4',4''-triisocyanatotriphenylmethane, and analogues and mixtures thereof.

In the present invention, polyisocyanates, such as a diisocyanate, i.e. a polyisocyanate comprising two isocyanate groups, or a triisocyanate, i.e. a polyisocyanate comprising three isocyanate groups, are particularly advantageous.

According to a first embodiment, the polyisocyanate can be monomeric polyisocyanate as listed above.

According to a second embodiment, the polyisocyanate can be oligomeric polyisocyanate. Examples of such oligomeric polyisocyanate that may be mentioned include hexamethylene diisocyanate trimers (HDI trimers or HDT) such as Tolonate HDT® and biurets such as Tolonate HDB®. Other examples of oligomeric polyisocyanates are aliphatic oligomeric isocyanates, such as isophorone diisocyanate dimers or trimers, and also hexamethylene diisocyanate derivatives of high functionality and low viscosity, and norbornene diisocyanate dimers and trimers. Examples of polyisocyanate mixtures that may be mentioned include isocyanate trimers such as HDT and isophorone diisocyanate trimer (IPDT). Polyisocyanates of tolylene diisocyanate (TDI) or of methanediphenyl isocyanate (MDI) derivatives may also be used.

In the present invention, the amount of at least one compound having at least one isocyanate group is from 0.1 wt % to 3.0 wt % with respect to the total weight of the composition. Preferably, the amount of at least one compound having at least one isocyanate group is from 0.2 wt % to 2.0 wt %, more preferably 0.3 wt % to 1.5 wt % with respect to the total weight of the composition.

In the present invention, a ratio of the at least one thermoplastic rubber to the at least one compound having at least one isocyanate group is from 2:1 to 4:1, preferably around about 3:1.

The composition according to the present invention may optionally comprise d) at least one filler.

In the present invention, the term "filler" is intended to denote, in particular, a material added to a polymer composition to improve its properties and/or to reduce the cost. Such materials can be in the form of solid, liquid or gas. By appropriately selecting these materials, not only the economics but also other properties such as processing and mechanical behavior can be improved. Although these fillers retain their inherent characteristics, very significant differences are often seen depending on the molecular weight, compounding technique and the presence of other additives in the formulation. Therefore, once the basic property requirements are established, the optimum type and the loading level of the filler for the balance between cost and performance must be determined.

In the present invention, the filler is preferably selected from the group consisting of glass fibres, glass beads, calcium carbonate, silicates, talc, kaolin, mica, carbon black, graphite, wood powders, and powders and fibres of other natural products, and synthetic fibres. Glass fibres are most advantageously used in the composition of the present invention.

In the present invention, an amount of at least one filler may be from 0 to 65.0 wt %, preferably from 0 wt % to 50.0 wt %, more preferably from 0 wt % to 45.0 wt % with respect to the total weight of the composition. When filler is present in the composition, its amount will be generally comprised between 5.0 and 65.0 wt %, preferably between 10.0 and 50.0 wt %, more preferably between 15.0 and 45.0 wt % with respect to the total weight of the composition. In addition, the composition according to the present invention may optionally comprise d) at least one additive. Examples of the additives, which may be advantageously used, include an antioxidant, a pore-forming agent, a surfactant, a nucleating agent, a plasticizer, a matting agent, a pigment, a colorant, a heat stabilizer, a light stabilizer, a bioactive agent, an antisoiling agent, an antistatic agent, a flame retardant, and a catalyst to accelerate the decarboxylation by reaction of the carboxylic acid functional group with the isocyanate functional group. The examples of the catalyst comprise, but are not limited to, tertiary amines, such as diazabicyclooctane (DABCO), diazabicycloundecene (DBU), triethylamine (TEA), and the like.

In the present invention, an amount of at least one additive may be from 0 to 2.0 wt %, preferably 0 to 1.5 wt %, more preferably 0 to 1.0 wt % with respect to the total weight of the composition. The range of concentration by weight of the additive, if contained in the composition of the present invention, may be from 0.1 to 2.0 wt %, preferably from 0.5 to 1.0 wt % with respect to the total weight of the composition.

Another aspect of the present invention is to provide a method for producing the composition according to the present invention.

The method comprises i) preparing a master-batch comprising a mixture of b) at least one thermoplastic rubber and c) at least one compound having at least one isocyanate group; ii) heating a) at least one polyamide comprising at least one carboxylic group and optionally d) at least one filler and e) at least one additive at a temperature equal to or greater than a melting point of the polyamide to obtain a molten polyamide matrix; and iii) adding at least a portion of the master-batch to the molten polyamide matrix. Thusly-obtained product can be further stabilized. The stabilization can be accomplished physically (for example, by cooling to a temperature below the melting point of the polyamide) and/or chemically (for example, by crosslinking the polyamide). Cooling is generally obtained by carrying out a quenching, which results in a rapid decrease of the temperature. The crosslinking of the polyamide can be carried out by addition of crosslinking agents known to a person skilled in the art. In general, these are compounds comprising at least two functional groups which react with the acid and/or amine functional groups of the polyamide. Mention may be made, as examples of crosslinking agents, of carbonylbislactams, such as carbonylbiscaprolactam, bisoxazine, bisoxazoline, and the like. The stabilization is advantageously carried out physically and by cooling.

In this regard, it is difficult to introduce a compound having at least one isocyanate group to a molten polyamide, because said compound is often deteriorated when being introduced into a molten polyamide matrix, and thus, only a partial portion of isocyanate groups in the compound are introduced into the molten polyamide, which results in less generation of $CO_2$ than expected.

In order to overcome said disadvantage, a master-batch comprising a mixture of b) at least one thermoplastic rubber and c) at least one compound having at least one isocyanate is thus prepared prior to being added to a) at least one polyamide comprising at least one carboxylic group which is in a molten state through the heating step ii) of the method of the present invention.

The method of the present invention comprises adding a pre-prepared mixture of a thermoplastic rubber and a compound having at least one isocyanate group to a molten polyamide, and in this manner, enables introducing relatively large portion, preferably a full amount of isocyanate groups of the compound c) into the polyamide matrix.

The temperature to be achieved during the heating step ii) is greater than or equal to the melting point of the polyamide of the composition. Advantageously, this temperature is greater than or equal to T(° C.)+10, preferably greater than or equal to T(° C.)+15, T(° C.) being the melting point of polyamide of the composition.

Fillers d) as above detailed as well as additives e) as above listed can be introduced during the heating step ii) or in any step conducted later-on.

The preparation of a foamable polyamide composition of the invention and the preparation of a polyamide foam therefrom can be carried out either separately or simultaneously. In case they are carried out simultaneously, both processes can be carried out in an identical device, such as an extrusion device. The extrudate from the device may be subsequently cooled and solidified as it is pulled through the die, which results in a desired shape of the polyamide foam.

The composition according to the present invention is foamable. Therefore, the present invention also pertains to a foam obtained from the composition of the present invention.

In order to obtain a foam in a desired shape from the composition of the present invention, a molding device, injection molding device, thermal forming or compressing device, for example of Sheet Molding Compound (SMC) type, injecting/blow molding device, extrusion device, extrusion/blow molding device, and the like may be employed depending on the requirements.

Further aspect of the present invention relates to a use of the foam as a light-weight material in aeronautical or motor vehicle, packaging or sound insulation applications, preferably in motor vehicle applications, such as bumpers, seating, dashboard, fuel systems, vehicle body including panels, under-bonnet components, interior trim, electrical components, exterior trim, lighting, upholstery, liquid reservoirs, etc., and to a motor vehicle comprising the foam according to the present invention. The weight of the motor vehicle may be reduced by incorporating the foam as a light-weight material into a motor vehicle, which accordingly results in the reduction of the energy consumption and also potential reduction of carbon dioxide emissions to the environments.

Other details or advantages of the present invention will become more clearly apparent through the examples given below. The present invention will be elucidated by the following examples, which are intended to demonstrate, but not to restrict, the invention.

EXAMPLES

The compositions used are as follows:
Examples 1 and 2 (for Comparative Examples): mixtures of polyamide 6,6, HDB (hexamethylene diisocyanate biuret), glass fiber and antioxidant.
Examples 3 and 4: mixtures of polyamide 6,6, HDB, SEBS (styrene-ethylene/butylene-styrene), glass fiber and antioxidant.
Chemical reagents used in the Examples are specified as follows:
  HDB: Tolonate HDB® from VencoreX
  SEBS: Taipol® 6150 from Third Sector Research Centre (TSRC)
  Glass fiber: 289H from Nippon Electric Glass (NEG)
  Polyamide: Technyl® 27B10 from Solvay
  Antioxidant: Irganox® B1171 from BASF
The compositions prepared are detailed in Table 1 below. The proportions are indicated in weight percentages in the composition.

TABLE 1

|  | Ex. 1 Comp. | Ex. 2 Comp. | Ex. 3 | Ex. 4 |
| --- | --- | --- | --- | --- |
| Polyamide | 69.1 | 68.8 | 67.7 | 66.7 |
| HDB | 0.6 | 0.9 | 0.6 | 0.9 |
| SEBS | 0 | 0 | 1.4 | 2.1 |
| Glass fiber | 30 | 30 | 30 | 30 |
| Antioxidant | 0.3 | 0.3 | 0.3 | 0.3 |
| Total | 100 | 100 | 100 | 100 |

Comparative Examples 1 and 2 (Hereinafter, Ex. 1 and 2 Comp.)

Heating polyamide 6,6 was carried out at a temperature of greater than or equal to its melting point to produce a molten polyamide 6,6. Ex. 1 and 2 Comp. were obtained by mixing said molten polyamide 6,6, HDB, glass fiber, and antioxidant together in a TES-30 twin-screw co-extrusion type extruder from JSW (Japan Steel Works) Corporation, with a screw length/diameter ratio of 40, while glass fibers being introduced through side feeder. The extrusion temperatures were 250-250-250-250-260-260-230-210-150° C. from nozzle to hopper, and the throughput and RPM were 30 kg/hr and 300, respectively.

The extrudates were then cooled in water at room temperature. The foaming ratio was determined as 2.8% and 4.2%, respectively, with respect to the total volume of Ex. 1 and 2 Comp.

Further, the flexural strength and the flexural modulus were measured using a Universal Test Machine (UTM) according to ASTM D790. In addition, the notch Izod was measured according to ASTM D256.

Examples 3 and 4 (Hereinafter, Ex. 3 and 4)

The master-batches for Ex. 3 and 4 were first prepared by mixing SEBS and HDB together. A molten polyamide 6,6 matrix was likewise produced by heating polyamide 6,6, glass fibers and antioxidant together at a temperature of greater than or equal to the melting point of polyamide 6,6. Said master-batches were subsequently introduced into the molten polyamide 6,6 matrix through a side feeder to obtain Ex. 3 and 4, respectively.

Ex. 3 and 4 were placed in the same extruder. The extrusion conditions were the same with those for Ex. 1 and 2 Comp.

The extrudates were likewise cooled in water at room temperature. The foaming ratio was determined as 11.6% and 14.8%, respectively, with respect to the total volume of Ex. 3 and 4.

Flexural strength, flexural modulus, and notch Izod were also measured. The measurement was performed using the same conditions and the same instrument, as detailed above.

The foaming ratio and the above mechanical parameters of the foam obtained from the Examples 1 to 4, which correspond to Ex. 1 and 2 Comp. and Ex. 3 and 4, respectively, are summarized in Table 2 below.

TABLE 2

|  | Ex. 1 Comp | Ex. 2 Comp | Ex. 3 | Ex. 4 |
|---|---|---|---|---|
| Foaming Ratio (%) | 2.8 | 4.2 | 11.6 | 14.8 |
| Flexural strength (MPa) | 244 | 238 | 231 | 221 |
| Flexural modulus (MPa) | 8,200 | 8,000 | 7,500 | 7,100 |
| notch Izod (J/m) | 135 | 130 | 125 | 110 |

As being confirmed from the experimental data in Table 2, the foaming ratios of Ex. 3 and 4 were noticeably increased compared to those of Ex. 1 and 2 Comp. Also, mechanical properties of the Examples 3 and 4, including flexural strength, flexural modulus and notch Izod, were still in a satisfactory level to be used as a light-weight material in a motor vehicle application such as engine cover, rocker box, etc.

The invention claimed is:
1. A composition consisting essentially of:
a) 21.0 to 99.6 wt % of at least one polyamide comprising at least one carboxylic group;
b) 0.3 to 9.0 wt % of at least one styrenic thermoplastic elastomer selected from the group consisting of styrene-ethylene/butylene-styrene, styrene-ethylene/propylene-styrene, styrene-ethylene/ethylene/propylene-styrene, and combinations thereof;
c) 0.1 to 3.0 wt % of at least one compound having at least one isocyanate group selected from hexamethylene diisocyanate trimers and biurets, and isophorone diisocyanate dimers and trimers;
d) 0 to 65.0 wt % of at least one filler selected from the group consisting of glass fibres, glass beads, calcium carbonate, silicates, talc, kaolin, mica, carbon black, graphite, wood powders, and synthetic fibres; and
e) 0 to 2.0 wt % of at least one additive;
wherein the sum of wt % of the components a) to e) is 100 wt % of the composition, wherein a foamed extrudate prepared from the composition exhibits a foaming ratio of 11.6 to 14.8%.

2. The composition according to claim 1, consisting essentially of:
a) 40.0 to 98.7 wt % of at least one polyamide comprising at least one carboxylic group;
b) 1.0 to 4.5 wt % of at least one styrenic thermoplastic elastomer selected from the group consisting of styrene-ethylene/butylene-styrene, styrene-ethylene/propylene-styrene, styrene-ethylene/ethylene/propylene-styrene, and combinations thereof;
c) 0.3 to 1.5 wt % of at least one compound having at least one isocyanate group selected from hexamethylene diisocyanate trimers and biurets, and isophorone diisocyanate dimers and trimers;
d) 15 to 45.0 wt % of at least one filler selected from the group consisting of glass fibres, glass beads, calcium carbonate, silicates, talc, kaolin, mica, carbon black, graphite, wood powders, and synthetic fibres; and
e) 0.1 to 2.0 wt % of at least one additive;
wherein the sum of wt % of the components a) to e) is 100 wt % of the composition.

3. The composition according to claim 1, wherein the at least one polyamide is selected from the group consisting of polyamide 6, polyamide 6,6, and mixtures and co-polyamides thereof.

4. The composition according to claim 1, wherein the at least one compound having at least one isocyanate group is hexamethylene diisocyanate trimer or isophorone diisocyanate trimer.

5. The composition according to claim 1, wherein the at least one additive is selected from the group consisting of an antioxidant, a pore-forming agent, a surfactant, a nucleating agent, a plasticizer, a matting agent, a pigment, a colorant, a heat stabilizer, a light stabilizer, a bioactive agent, an antisoiling agent, an antistatic agent, flame retardant, and a catalyst to accelerate the decarboxylation by reaction of the carboxylic acid functional group with the isocyanate functional group.

6. The composition according to claim 1, wherein the composition includes about 5 to 65.0 wt % of at least one filler.

7. The composition according to claim 1, wherein the at least one filler is selected from the group consisting of glass fibres, glass beads, calcium carbonate, silicates, talc, kaolin, mica, carbon black, graphite, and wood powders.

8. The composition according to claim 1, wherein the at least one filler is glass fibers.

9. A method for producing the composition according to claim 1, comprising:
i) preparing a master-batch comprising a mixture of the at least one styrenic thermoplastic elastomer and the at least one compound having at least one isocyanate group;
ii) heating the at least one polyamide and optionally the at least one filler at a temperature equal to or greater than a melting point of the polyamide to obtain a molten polyamide matrix; and
iii) adding at least a portion of the master-batch to the molten polyamide matrix.

10. A foam obtained from the composition according to claim 1, wherein the foam exhibits a foaming ratio of 11.6 to 14.8%.

11. An aeronautical vehicle, a motor vehicle, packaging, or sound insulation comprising the foam according to claim 10.

12. A motor vehicle comprising the foam according to claim 10.

* * * * *